July 17, 1956  T. RAMEN  2,754,897
PROCESSES FOR CONCENTRATING LIQUIDS CONTAINING
INCRUSTATION-FORMING SUBSTANCES
Filed Jan. 22, 1951  7 Sheets-Sheet 5

INVENTOR
Torsten Ramen
BY
Watson, Cole, Grindle & Watson
ATTORNEYS

United States Patent Office 2,754,897
Patented July 17, 1956

2,754,897

PROCESSES FOR CONCENTRATING LIQUIDS CONTAINING INCRUSTATION - FORMING SUBSTANCES

Torsten Ramen, Stockholm, Sweden

Application January 22, 1951, Serial No. 207,082

6 Claims. (Cl. 159—47)

The present invention relates to a process of concentrating liquids containing substances which tend to form incrustations at elevated temperatures and to apparatus for carrying such a process into practice. More particularly, the invention is concerned with a process of concentrating sulfite waste liquor.

Sulfite waste liquor contains a certain amount of slightly soluble calcium salts, particularly calcium sulfate but to a lesser degree also calcium sulfite, calcium bisulfite and other calcium salts. The presence of these salts causes difficulties in the concentration of the sulfite waste liquor, because when the liquor is concentrated to a certain degree, the saturation concentration of these slightly soluble salts is reached and consequently as the liquor is further concentrated, these salts are precipitated, forming incrustations upon the heating surfaces of the evaporators, thus impairing the efficiency of the evaporators.

As the solubility of these incrustation-forming calcium salts in sulfite waste liquor decreases sharply with increasing temperature it has been proposed to heat the sulfite waste liquor under pressure to a temperature of for instance 150–160° C. in order to precipitate the calcium salts and enable them to be separated, either before the concentration of the liquor or after one or two preliminary evaporation steps.

The inventor has found, however, that with this method satisfactory results are obtained only when the evaporation is not carried to a high concentration or, in the last-mentioned case, when the initial sulfite waste liquor has a low content of calcium salts. It is often desirable to obtain a concentrated sulfite waste liquor having the highest possible concentration. Owing to the increasing viscosity of the liquor this will require the use of comparatively high temperatures in the last evaporation steps to take advantage of the lower viscosity at the higher temperatures. As the solubility of calcium sulfate decreases with increasing temperatures, it will, particularly with a high calcium sulfate content in the initial waste liquor, under these conditions be impossible to avoid formation of incrustations on the heating surfaces in the last evaporation stages, even if the waste liquor is preliminarily heated under pressure in the manner indicated above.

In accordance with the present invention it is proposed to subject the liquid to be concentrated, for instance sulfite waste liquor, to two or more pressure heating steps, the liquid being evaporated in one or more steps subsequently to each pressure heating step. The temperatures in the pressure heating steps are adjusted in such a manner that the content of incrustation-forming substances in the subsequent evaporation steps will be below the saturation concentration of the incrustation-forming substances at the temperatures and liquor concentrations of these evaporation steps. In this manner the formation of incrustations in the evaporation steps will be prevented or minimized.

The invention will now be described more fully with raeference to the accompanying drawings, where.

Figure 1:
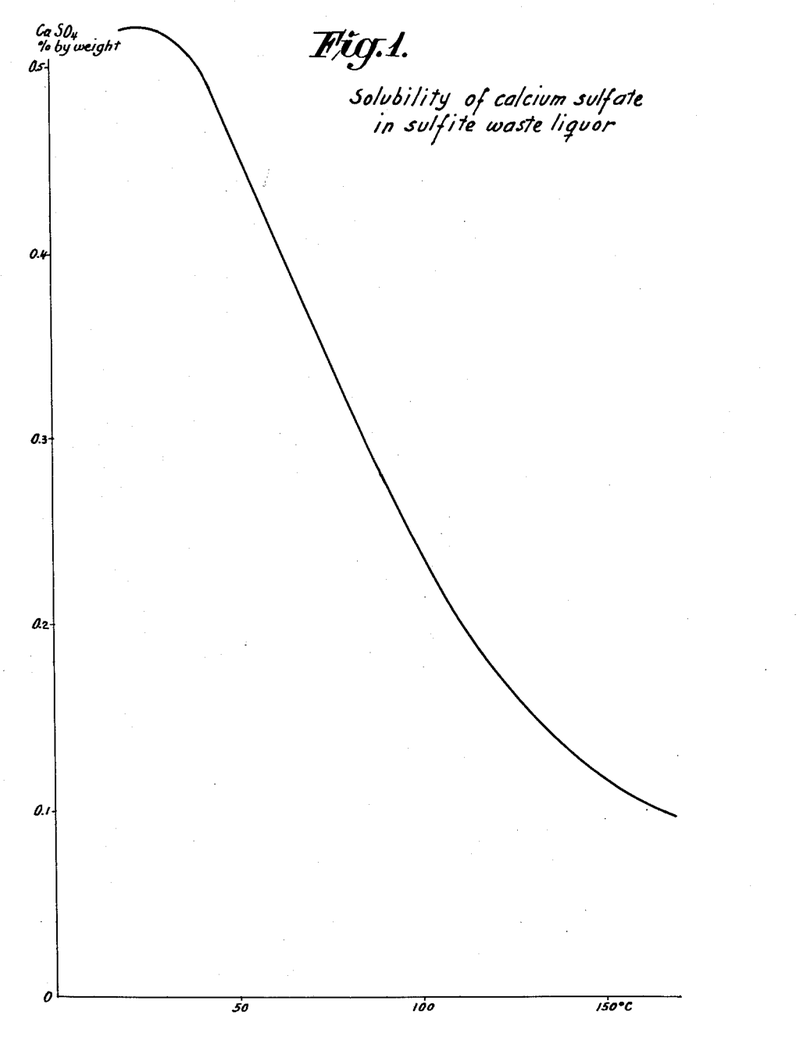
Fig. 1 is a graph showing the normal solubility of calcium sulfate in sulfite waste liquor at varying temperatures.

Referring now to Fig. 1, there is shown a typical example of a solubility curve of calcium sulfate in sulfite waste liquor. It is seen that the solubility of this salt decreases sharply as the temperature increases. It is to be understood that this curve illustrates only a typical example, as the solubility of the calcium sulfate varies somewhat with the composition of the sulfite waste liquor and particularly with its pH value, the solubility being at a minimum at pH 3.5. In most cases, however, the solubility follows more or less closely the curve shown in Fig. 1.

Figure 2:
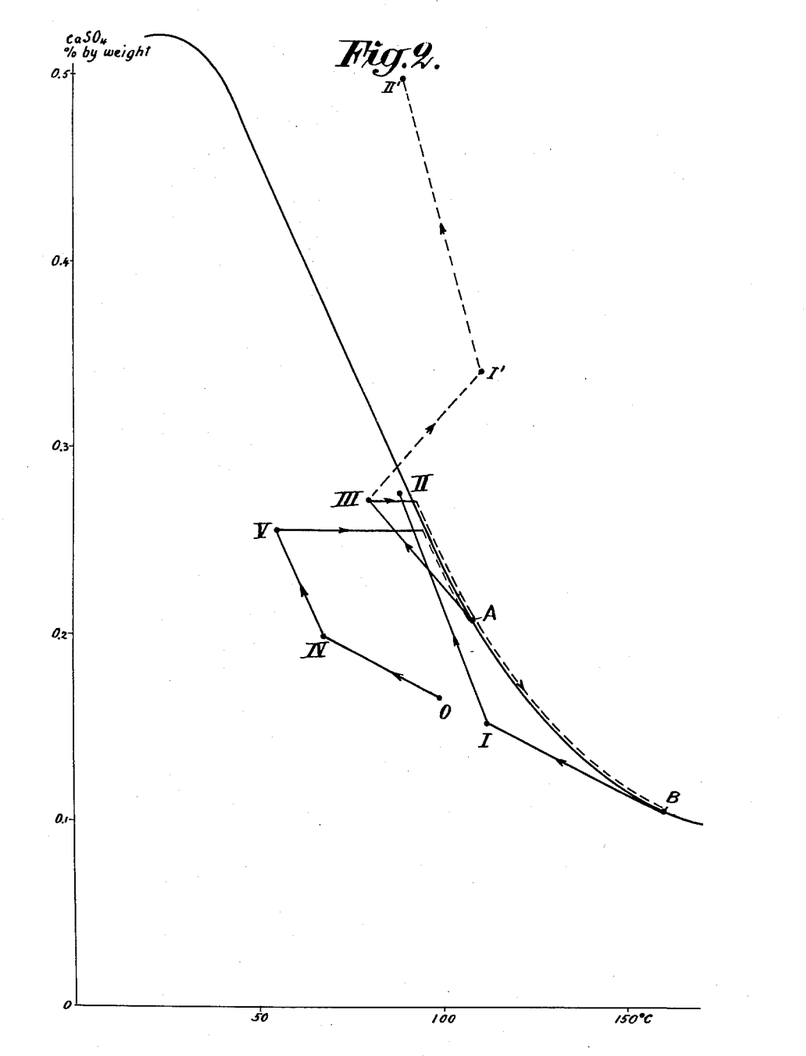
Fig. 2 illustrates an embodiment of the process of this invention in connection with a solubility diagram as shown in Fig. 1.

One embodiment of the present invention is illustrated in Fig. 2, wherein the calcium sulfate content of sulfite waste liquor during the different steps of a five step evaporation process is represented in connection with a solubility curve identical with the one shown in Fig. 1. The sulfite waste liquor is introduced into the system at a temperature of 100° C. and having a solid content of 9.7% and a calcium sulfate content of 0.169 corresponding to point O. The liquor is introduced into evaporation step IV, where it is evaporated at 67° C. to a solid content of 11.6%, corresponding to a calcium sulfate content of 0.202%. The liquor then passes to evaporation step V, where it is evaporated at 55° C. to a solid content of 14.7% and a calcium sulfate content of 0.256%. It is thereupon taken to a pressure heating step A, where it is heated to 110° C. with direct steam to separate part of the calcium sulfate and other incrustation forming substances of the liquor. The liquor from this step has a solid content of 14.2% and a calcium sulfate content of 0.204%. The liquor passes to evaporation step III. In this step evaporation is carried out at a temperature of 80° C. resulting in a solid content of 19.7% and a calcium sulfate content of 0.272%. Thereupon the liquor is introduced into a second pressure heating step B, the liquor being heated in this step to a temperature of 160° C. to precipitate the incrustation-forming substances. The liquor leaving this step has a solid content of 17.3% and a calcium sulfate content of 0.106%. This liquor is further evaporated in evaporation steps I and II at temperatures of 112 and 90° C. respectively, the solid content of the liquor in these steps being raised to 25.0% and 45.0% respectively and its calcium sulfate content to 0.153% and 0.275% respectively. As will be apparent from the diagram in all evaporation steps, the calcium sulfate concentration of the liquor will in this manner be kept below the saturation concentration and no incrustations will be formed in the evaporators of the system.

In Figure 2 there is also illustrated what would happen, if the second pressure heating step were omitted, and the liquor were to be pressure heated in only one step in accordance with previously proposed methods. In this case the sulfite waste liquor would be taken directly from evaporation step III to evaporation step I and from there to evaporation step II. The broken lines III—I' and I'—II' correspond to this method. It is seen that in evaporation step I the calcium sulfate content of the liquor would be raised to 0.344 and in step II to 0.505. These values are well above the solubility curve of the calcium sulfate and this method would therefore result in precipitation of calcium sulfate in these steps.

Figure 3:
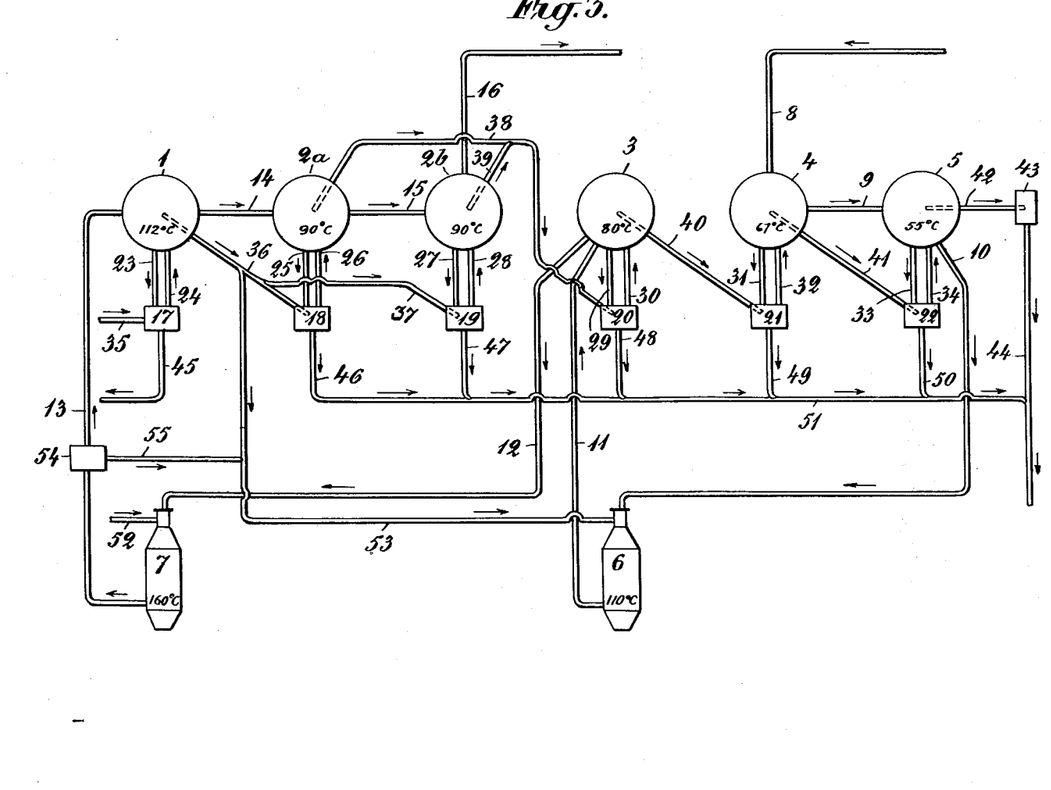
Fig. 3 shows diagrammatically an evaporation system for carrying out the process illustrated in Fig. 2.

An evaporation system for carrying out the above described process is illustrated diagrammatically in Fig. 3. This system comprises six evaporators 1, 2a, 2b, 3, 4 and 5, corresponding to the evaporation steps described above, two evaporators 2a and 2b being used in the evaporation step II, where the sulfite waste liquor is most concentrated. The evaporators are operated at 112° C., 90° C., 90° C., 80° C., 67° C. and 55° C., respectively, as indicated above. The system further comprises two pressure heating apparatus 6 and 7, corresponding to the above described pressure heating steps A and B respectively. The liquor to be concentrated is introduced through conduit 8 into evaporator 4, wherefrom it is taken over conduit 9 into evaporator 5 and over conduit 10 into the pressure heating apparatus 6, and further through conduit 11 into evaporator 3. From this evaporator the liquor passes through conduit 12 to pressure heating apparatus 7 and through conduit 13 into evaporator 1. Thereupon the liquor passes through conduit 14 into evaporator 2a and through conduit 15 into evaporator 2b, wherefrom it is withdrawn through conduit 16. Each evaporator is provided with a heat exchanger for heating the liquid with steam, indicated at 17, 18, 19, 20, 21 and 22 respectively. The liquor introduced in for instance evaporator 1 is circulated through heat exchanger 17 over conduits 23 and 24. There are provided similar conduits 25 and 26, 27 and 28, 29 and 30, 31 and 32, 33 and 34, for circulating the liquor through the other heat exchangers. In each heat exchanger the liquor is heated with steam, which is taken from an evaporation step having a higher temperature, except in heat exchanger 17, to which steam is supplied from an external source through conduit 35. Thus steam is supplied to heat exchangers 18 and 19 from evaporator 1 over a conduit 36 and a branch conduit 37. The steam released in evaporators 2a and 2b is supplied to heat exchanger 20 over conduits 38 and 39, and heat exchangers 21 and 22 are supplied with steam from evaporators 3 and 4 respectively over conduits 40 and 41 respectively. The steam formed in evaporator 5 is delivered over a conduit 42 to a condensor 43 and the condensate formed in this condensor is withdrawn through conduit 44. When the steam is used to heat the liquor in the heat exchangers it condenses. The condensate thus formed in heat exchanger 17 is withdrawn through conduit 45, while the condensates formed in the other heat exchangers are withdrawn through conduits 46, 47, 48, 49 and 50 respectively and collected in a common conduit 51, which discharges into the conduit 44. The condensates thus united are suitably conducted to a tank (not shown).

To heat the liquor in pressure heating apparatus 7 steam is supplied from an external source through conduit 52. The steam employed to heat the liquor in pressure heating apparatus 6 is taken from evaporator 1 over conduit 36 and a branch conduit 53.

At 54 there is indicated a suitable expansion device provided in the conduit 13, said device serving to expand the liquor heated in pressure heating apparatus 7, the steam formed by this expansion being supplied over a conduit 55 and the conduit 53 to the pressure heating apparatus 6. The steam formed in the expansion may also be employed as a heating medium in any of the heat exchangers of the various evaporation steps. It is to be understood, however, that this expansion step may be omitted.

Figure 5:
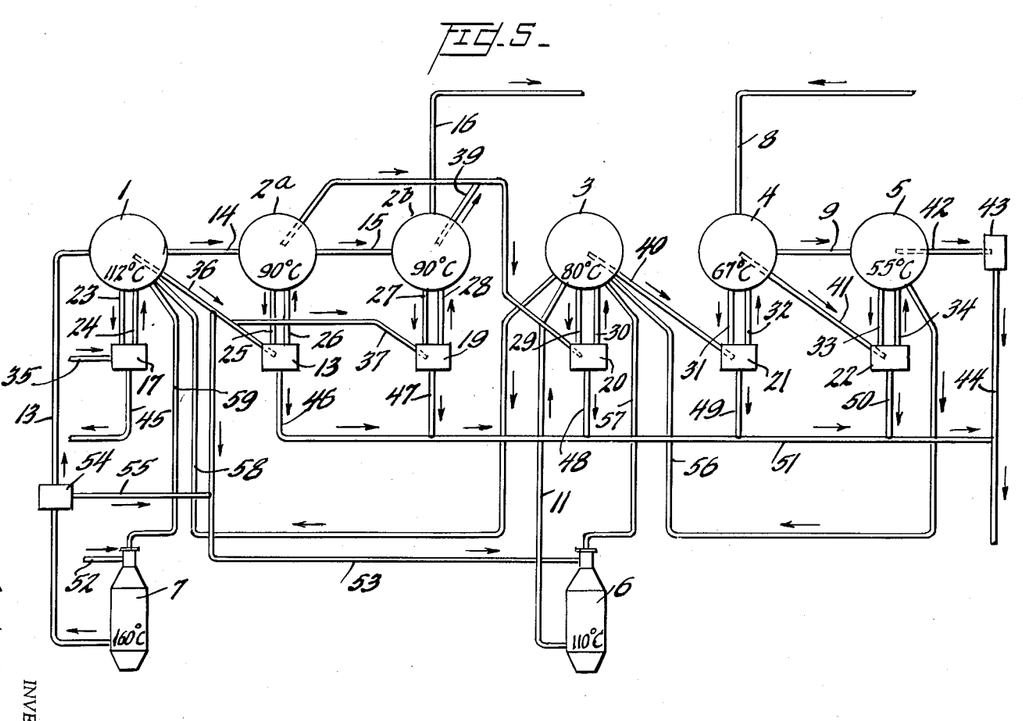
Figure 5 shows diagrammatically an evaporation system for carrying out the process illustrated in Figure 4.

Figure 5 shows an alternative method of carrying out the pressure heating of the liquor. Instead of introducing the liquor from evaporator 5 directly into the pressure heating apparatus 6 it is introduced first into the evaporator 3. From this evaporator there is continuously withdrawn a certain part of the liquor which is circulated thorugh the pressure heating apparatus 6 and re-introduced into the evaporator 3. This is indicated by the conduits 56 and 57. In the same manner the liquor from evaporation step 3 is introduced directly into the evaporator 1, part of the liquid being continuously withdrawn from this evaporator, circulated through pressure heating apparatus 7 and reintroduced into the evaporator 1, as indicated by the conduits 58 and 59. This manner of effecting the pressure heating has certain advantages from a heat-economy viewpoint. When the liquor is introduced directly into the pressure heating apparatus it has to be heated through a great temperature difference in the pressure heating apparatus, e. g. from 55 to 110° C. in pressure heating apparatus 6 in accordance with the above described example. If on the other hand in accordance with the alternative method the liquor is first introduced into the next evaporator and thereupon into the pressure heating apparatus, the temperature difference is reduced and the liquor is heated from only 80 to 110° C. in the pressure heating apparatus in accordance with the above described example. This reduces the amount of steam to be used in the pressure heating apparatus and also reduces the dilution of the liquor in this apparatus, if direct steam is used for the heating.

Figure 4:
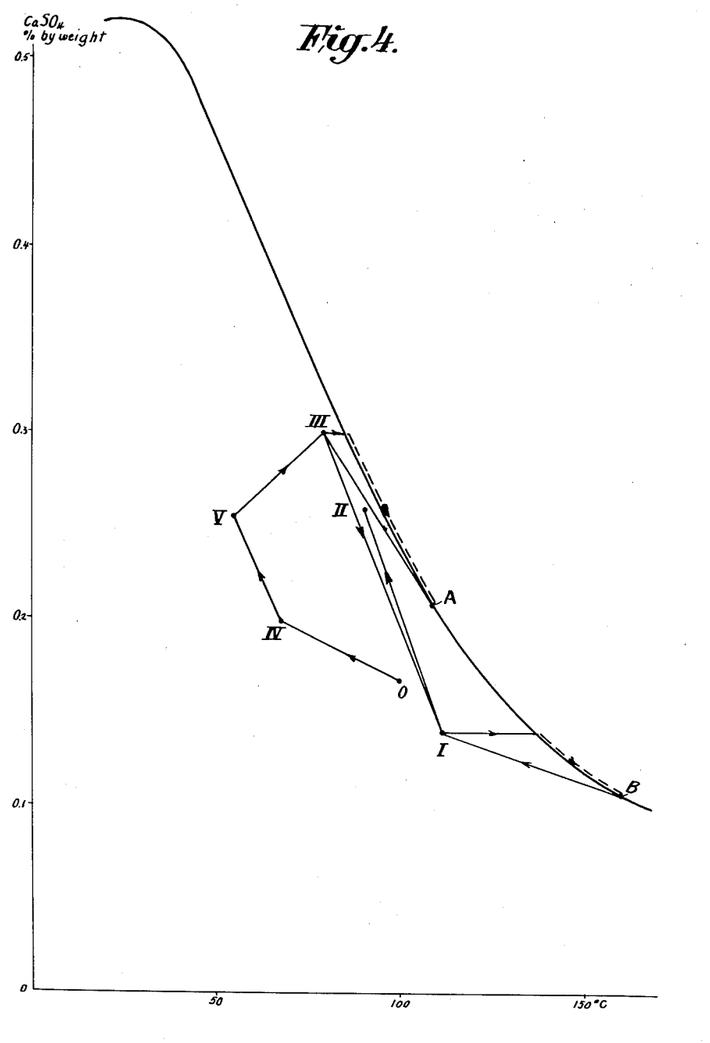
Fig. 4 is a diagram similar to Fig. 2, showing a modified form of the process.

This alternative method is further explained in connection with Fig. 4, which shows a diagram similar to that of Fig. 2. In this example the sulfite waste liquor to be treated is the same as in Fig. 2. Thus the points O, IV and V are identical with the corresponding points in Fig. 2. From the evaporation step V the liquor is taken to evaporation step III where it is evaporated at 80° C. By continuously circulating a certain amount of this liquid through a pressure heating step where it is heated to 116° C. (point A) and re-introducing it into the evaporation step and by regulating the amount of liquid thus circulated the calcium sulfate content of the liquor in this evaporation step may be maintained at any desired value below the saturation concentration at the temperature of this evaporation step and in the illustrated example the amount of circulated liquor has been selected in such a manner that the calcium sulfate content of the liquor in evaporation step III is 0.300. From this evaporation step the liquid is taken to evaporation step I where it is evaporated at 112° C. Part of the liquor is continuously circulated through the pressure heating step at 160° C. (point B) to precipitate calcium sulfate and re-introduced in the evaporation step I, the amount of liquor to be circulated being selected in such a manner that the calcium sulfate content of the liquor in evaporation step I will be maintained at 0.140%. The liquor is thereupon taken to evaporation step II where it is evaporated at 90° C. to a solid content of 45% and a calcium sulfate content of 0.260%. In this manner the content of incrustation forming substances of the liquor in the evaporation steps is maintained below the saturation concentration in all the successive evaporation steps, as will be apparent from the Figure 4.

It will be seen from the above that the present invention provides a method which makes possible the evaporation of such liquids as sulfite waste liquor to a high concentration at high temperatures, while completely or substantially avoiding the formation of incrustations upon the heating surfaces of the evaporators.

Figures 6, 7:
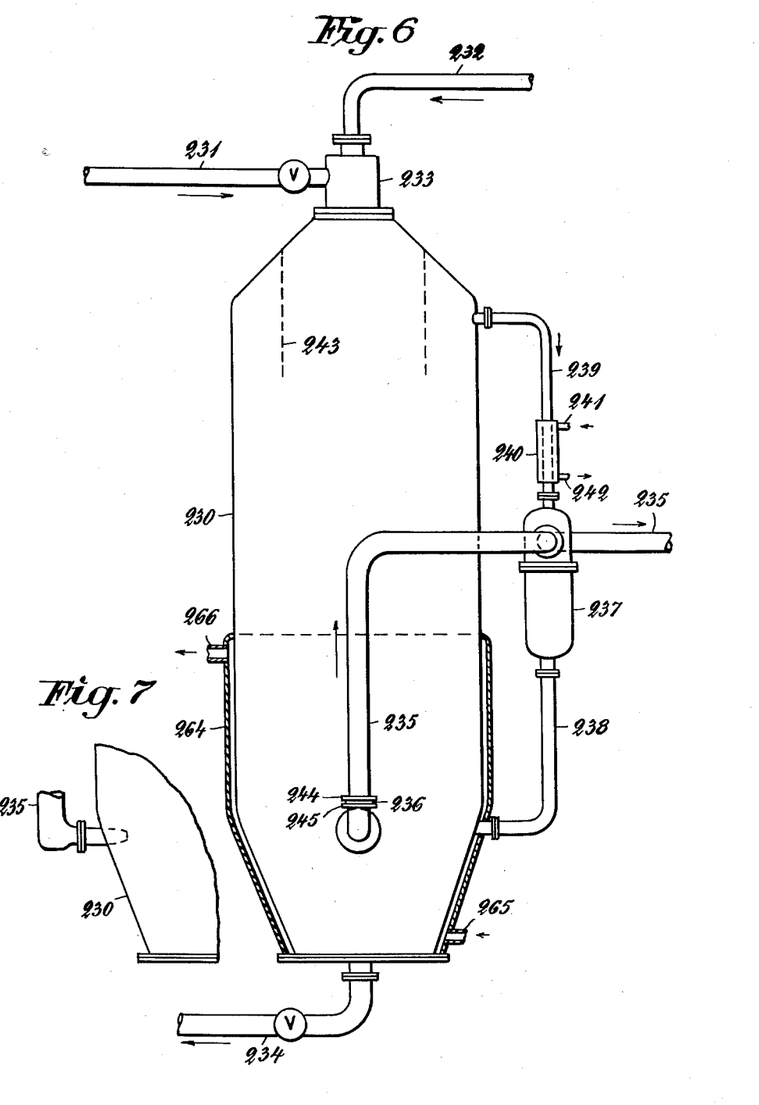
Fig. 6 is an elevation, partly in section, of a preferred form of the pressure-heating apparatus.
Fig. 7 is a fragmentary view of a modified form of this apparatus.
Figure 8:
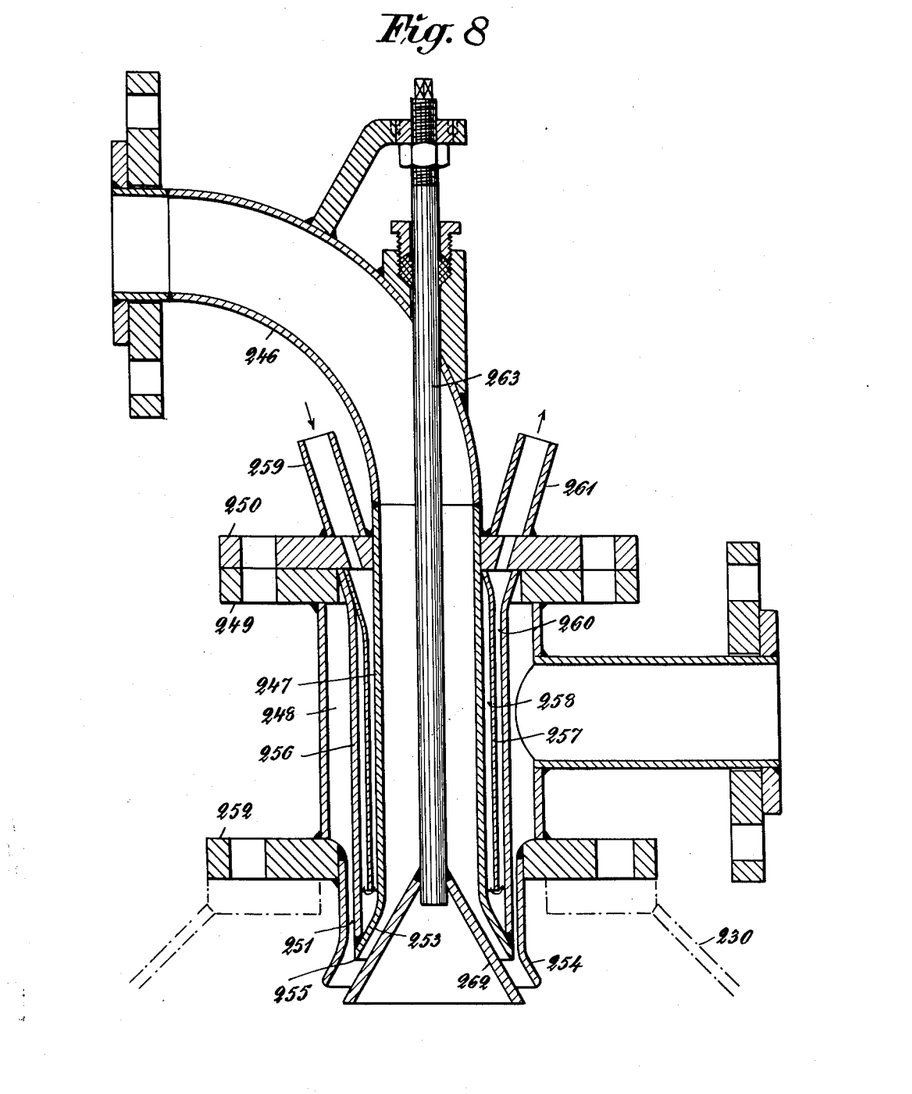
Fig. 8 shows on an enlarged scale a detail of the pressure heating apparatus.

A preferred form of pressure heating apparatus to be used in the above described system is illustrated in Figs. 6, 7 and 8. This apparatus is arranged in such a manner that the heated liquid will be cooled rapidly—in a degree dependent upon the concentration and the temperature and easily establishable experimentally—immediately prior to or simultaneously with its contact with such parts of the walls of the apparatus or the conduits leading to it, where an undesired deposition of solids present in the solution may take place. Such cooling of the liquid may be accomplished with the aid of a gas or liquid stream directed against the walls, for instance a stream of air or water if desired with the use of suitable cooling jackets, through which water or air is circulated, or particularly in the case of liquid conduits by throttling the liquid stream under pressure in the conduit, causing a partial vaporization of the liquid and consequently a simultaneous increase of the rate of flow in the conduit, said increase of the rate of flow further improving the effect. Such throttling is preferably adjustably arranged and may be effected in a desired number of points in the liquid conduit, above all at or adjacent its inlet or outlet into the heating vessel.

In Fig. 6 the pressure heating apparatus as indicated 230 and 231 is a liquid supply conduit and 232 is a conduit for supplying steam, which by means of a joint inlet for steam and liquid arranged at the top of the pressure heating apparatus and in this case having the form of an ejector and provided with a mixing and spraying nozzle debouching between two conical jackets effects an intimate mixture of the steam and the liquid in such a manner that these are thrown in intimate and immediate mixture obliquely downwards firstly preferably against a cylindrical sprinkle screen 243 at the top portion of the pressure heating apparatus indicated with broken lines, to fall under very efficient separation of the calcium salts to the bottom of the pressure heating apparatus, where the separated sludge is removed periodically or if desired continuously through an outlet 234. The pressure heating apparatus 230 is provided with a level regulator 237, connected to its liquid portion over a conduit 238 and to its steam portion over a conduit 239, to which there is connected a condenser 240 having an inlet 241 and an outlet 242 for cooling water, so that the regulator will always operate in a pure condensate obtained from the steam in the pressure heating apparatus. The level regulator controls an adjusting valve arranged within a conduit 235 for withdrawing liquid, which is taken through the top part of the regulator, so that there will always be a constant liquid level in the pressure heating apparatus.

To minimize deposition of calcium salts and other precipitated components of the liquid in the conduit 235 there is provided adjacent the inlet of conduit 235 in the pressure heating apparatus, for instance at 236, a throttling disc fixed between two connecting flanges 244 and 245, or in any other manner there is effected a throttling of the liquid withdrawn under pressure so that a partial vaporization and consequently a considerable increase in the rate of flow of the outgoing liquid in the conduit 235 after the throttling at 236. As a result of this increase of the rate of flow and the fall of temperature simultaneously produced at the throttling point any deposition of calcium salts and other substances precipitated therewith is prevented or reduced. In accordance with Fig. 7 the throttling disc indicated in Fig. 6 has been replaced by a prolonged inlet end of the conduit 235 having a reduced area of flow at its opening and extended into the inner of the pressure heating apparatus. A further widening of the conduit 235 for the outgoing liquid may of course be provided preferably immediately after the throttling place to secure the expansion of the liquid which is necessary for vaporizing the liquid at its leaving the pressure heating apparatus.

To attain a rapid and efficient heating of the liquid with steam these are introduced at the top of the apparatus by means of an ejector shown in Fig. 8. This comprises a central curved steam pipe 246 connected to the steam conduit 232 (Fig. 6) and an annular inlet channel 248 for liquid enclosing the vertical outlet end 247 of the steam pipe 246, said channel being connected at its top end to the steam pipe 246 in any suitable manner, for instance by means of flanges 249 and 250 clamped together by bolts. Adjacent the outlet end of the ejector the liquid channel is constricted as shown at 251, and the ejector assembly is arranged to be fastened to the top of the pressure heating apparatus by means of a flange 252 secured to the outer jacket of the liquid channel 248. At the outlet proper the wall 253 of the steam pipe 246 as well as the extreme edge of the wall of the constricted liquid channel are curved conically outwardly, the apex angles being similar in both cones. The bending point 254 of the liquid wall is at least substantially in the same horizontal plane as the extreme edge 255 of the outlet end of the conically curved steam pipe. In accordance with this invention a cooling jacket 256 is formed around the steam pipe, said jacket extending from the conically curved edge 255 of the steam pipe up through the liquid channel along its entire length. An annular partition 257 divides the cooling chamber formed by the cooling jacket 256 into two longitudinal concentric channels, one inner channel 258 communicating with the inlet 259 for cooling liquid and an outer channel 260 communicating with an outlet 261 for cooling liquid. In this manner direct contact between the liquid which is usually heated to a temperature very near the temperature of the pressure heating apparatus and the hot steam pipe, and a resulting deposition of incrustations in the liquid inlet of the ejector is avoided.

A spraying cone 262 is fastened in a known manner to a spindle 263 and is adjustable by means of this spindle, forming an annular adjustable outlet, wherein the steam and the liquid meet to be thrown down into the enclosure. Deposits formed by precipitated calcium salts and other substances on the walls of the pressure heating apparatus particularly on the walls of the liquid space in its lower part are avoided by means of a cooling jacket 264 (Fig. 6) arranged to enclose the walls of the liquid space and provided with an inlet 265 and an outlet 266 for the cooling medium, which may be a liquid or a gas. To secure a smooth circulation of the cooling medium in the cooling jacket this may be provided with suitable guiding surfaces and/or be divided into a number of separate sections.

Though the invention has been described particularly with reference to the treatment of sulfite waste liquor it is to be understood that it may be applied to the treatment of other liquids having similar properties. It is also obvious to one skilled in this art that many modifications are possible without departing from the scope of the invention.

Having now particularly described the nature of my invention and the manner of its operation what I claim is:

1. A process of concentrating a liquid containing dissolved substances the solubility of which in said liquid decreases as the temperature increases, said process comprising heating said liquid under pressure to a temperature sufficient to cause precipitation of a substantial portion of said substances, concentrating said liquid by evaporation at temperatures below that to which the liquid was heated to an extent such that the concentration of the liquid with respect to said substances is still below the saturation concentration of said substances at the temperatures at which the evaporation is carried out, heating said liquid under pressure to a temperature sufficient to cause precipitation of a further substantial portion of said substances and concentrating said liquid by evaporation at temperatures below the last-mentioned temperature but above the temperatures at which the first evaporation was carried out, to an extent such that the concentration of the liquid with respect to said substances is still below the saturation concentration of said substances at the temperatures at which the evaporation is carried out.

2. A process as claimed in claim 1, wherein the last-mentioned evaporation is effected at temperatures above that to which the liquid was heated in the first heating step and the vapors formed by said evaporation are used to heat the liquid in the first heating step.

3. A process as claimed in claim 1, which comprises expanding the liquid heated in a pressure-heating step and utilizing the resulting vapors as a heating medium to heat the liquid in a step of the process carried out at a lower temperature than that of said pressure-heating step.

4. A process as claimed in claim 1 wherein said liquid is sulfite waste liquor.

5. A process of concentrating a liquid containing dissolved substances the solubility of which in said liquid decreases as the temperature increases, which comprises continuously introducing said liquid into an evaporator and evaporating the liquid in said evaporator, continuously withdrawing liquid from said evaporator and heating it under pressure to a temperature above that at which the evaporation is carried out and continuously re-introducing said heated liquid into said evaporator, the amount of liquid withdrawn from the evaporator and the temperature to which it is heated being such as to cause precipitation of a sufficient amount of said substances to maintain the concentration of the liquid in said evaporator with respect to said substances below the saturation concentration of said substances at the temperature at which the liquid is evaporated in said evaporator.

6. A process of concentrating a liquid containing dissolved substances the solubility of which in said liquid decreases as the temperatures increases, said process comprising concentrating said liquid by evaporation to an extent such that the concentration of said liquid with respect to said substances is still below the saturation concentration of said substances, heating the liquid under pressure to a temperature sufficient to cause precipitation of a portion of said substances, concentrating said liquid by evaporation at a temperature below that to which the liquid was heated but above that at which the liquid was evaporated in the first evaporation step to an extent such that the concentration of the liquid with respect to said substances is still below the saturation concentration of said substances at the temperatures at which the evaporation is carried out, heating said liquid under pressure to a temperature sufficient to cause precipitation of a further substantial portion of said substances, and concentrating said liquid by evaporation at temperatures below the last-mentioned temperature but above the temperatures at which the second evaporation was carried out, to an extent such that the concentration of the liquid with respect to said substances is still below the saturation concentration of said substances at the temperatures at which the evaporation is carried out.

References Cited in the file of this patent

UNITED STATES PATENTS

| Number | Name | Date |
|---|---|---|
| 777,114 | Lillie | Dec. 13, 1904 |
| 936,760 | Childs | Oct. 12, 1909 |
| 1,005,600 | Childs | Oct. 10, 1911 |
| 1,006,197 | Frasch | Oct. 17, 1911 |
| 1,257,341 | Greene | Feb. 26, 1918 |
| 1,303,252 | Brussard | May 13, 1919 |
| 1,600,784 | Aiken | Sept. 21, 1926 |
| 1,682,265 | Bringhenti | Aug. 28, 1928 |
| 1,853,045 | Gnau | Apr. 12, 1932 |
| 1,886,590 | Rosenblad | Nov. 8, 1932 |
| 2,174,695 | Frickie | Oct. 3, 1939 |
| 2,187,030 | Hinckley | Jan. 16, 1940 |
| 2,256,954 | Smith | Sept. 23, 1941 |
| 2,368,049 | Stratford | Jan. 23, 1945 |
| 2,406,581 | Bergstrom et al. | Aug. 27, 1946 |
| 2,434,672 | Pattee | Jan. 20, 1948 |
| 2,459,302 | Aronson | Jan. 18, 1949 |
| 2,460,546 | Stephanoff | Feb. 1, 1949 |
| 2,488,598 | Lockman | Nov. 22, 1949 |
| 2,490,750 | Grewin et al. | Dec. 6, 1949 |
| 2,490,759 | Tyden | Dec. 6, 1949 |
| 2,519,618 | Wilson et al. | Aug. 22, 1950 |
| 2,572,321 | Deanesly | Oct. 23, 1951 |
| 2,596,875 | Stewart | May 13, 1952 |
| 2,647,570 | Lockman | Aug. 4, 1953 |

FOREIGN PATENTS

| Number | Country | Date |
|---|---|---|
| 171,158 | Australia | May 10, 1952 |